(12) United States Patent
Marks

(10) Patent No.: US 8,090,207 B2
(45) Date of Patent: Jan. 3, 2012

(54) ADAPTIVE COMPRESSION QUALITY

(75) Inventor: Laurence V. Marks, Raleigh, NC (US)

(73) Assignee: International Business Machines Corporation, Armonk, NY (US)

( * ) Notice: Subject to any disclaimer, the term of this patent is extended or adjusted under 35 U.S.C. 154(b) by 131 days.

(21) Appl. No.: 12/415,276

(22) Filed: Mar. 31, 2009

(65) Prior Publication Data

US 2009/0190847 A1 Jul. 30, 2009

Related U.S. Application Data

(63) Continuation of application No. 10/353,765, filed on Jan. 28, 2003, now Pat. No. 7,551,787.

(51) Int. Cl.
G06K 9/36 (2006.01)
G06K 9/46 (2006.01)
(52) U.S. Cl. ........................................ 382/239
(58) Field of Classification Search .................. None
See application file for complete search history.

(56) References Cited

U.S. PATENT DOCUMENTS

| | | |
|---|---|---|
| 5,398,066 A | 3/1995 | Martinez-Uriegas et al. |
| 5,412,427 A | 5/1995 | Rabbani et al. |
| 5,625,712 A | 4/1997 | Schoenzeit et al. |
| 5,677,689 A | 10/1997 | Yovanof et al. |
| 5,680,129 A | 10/1997 | Weinberger et al. |
| 5,748,116 A | 5/1998 | Chui et al. |
| 5,819,215 A | 10/1998 | Dobson et al. |
| 5,838,818 A | 11/1998 | Herley |
| 5,907,619 A | 5/1999 | Davis |
| 6,009,201 A | 12/1999 | Acharya |
| 6,038,346 A | 3/2000 | Ratnakar |
| 6,044,177 A | 3/2000 | Herley |
| 6,128,413 A | 10/2000 | Benamara |
| 6,195,462 B1 | 2/2001 | Bryniarski et al. |
| 6,263,106 B1 | 7/2001 | Yamagata |

(Continued)

FOREIGN PATENT DOCUMENTS

EP 798665 A2 10/1997

(Continued)

OTHER PUBLICATIONS

IBM Technical Disclosure Bulletin, vol. 37, No. 04B, entitled "Algorithm to Allow a Computer System's BootROM in Compressed Form", Apr. 1994, pp. 571-572.
Institution of Electrical Engineers Journal, vol. 5, No. 6, entitled "Dynamic adaptation in an image transcoding proxy for mobile Web browsing", Han et al, 1998, pp. 8-17.

(Continued)

Primary Examiner — Yuzhen Ge
(74) Attorney, Agent, or Firm — Patrick J. Daugherty; Driggs, Hogg, Daugherty & Del Zoppo Co., LPA

(57) ABSTRACT

Images captured in a digital form are stored in a digital storage device with already-stored images by determining if a percentage of a finite storage capacity of the digital storage device needed to store the captured and already stored images in the storage device exceeds a pre-set threshold value, wherein storage used of the finite storage capacity to store images may exceed the pre-set threshold value. If the percentage of storage space needed to store the captured and already stored images in the storage device exceeds the pre-set threshold value, then at least one of the captured and already stored images are compressed and all of the captured and already stored images, including all of the compressed images of the captured image and the already stored image, are stored in the storage device.

27 Claims, 6 Drawing Sheets

U.S. PATENT DOCUMENTS

| | | | |
|---|---|---|---|
| 6,301,392 B1 | 10/2001 | Acharya | |
| 6,636,879 B1 * | 10/2003 | Doucette et al. | 707/690 |
| 6,647,415 B1 * | 11/2003 | Olarig et al. | 709/224 |
| 6,735,341 B1 | 5/2004 | Horie et al. | |
| 6,885,395 B1 | 4/2005 | Rabbani et al. | |
| 6,931,159 B2 | 8/2005 | Ridge | |
| 6,934,418 B2 | 8/2005 | Okada | |
| 6,999,626 B2 | 2/2006 | Andrew | |

FOREIGN PATENT DOCUMENTS

| | | |
|---|---|---|
| GB | 2339989 A | 2/2000 |
| JP | 08214058 A | 8/1996 |
| JP | 2000200284 A | 7/2000 |
| WO | 9900762 A1 | 1/1999 |

OTHER PUBLICATIONS

Institution of Electrical Engineers Journal, Catalog No. 98TB100225, entitled "Lossless compression of pre-press images using linear color decorrelation", Storer et al, 1998, p. 578.

* cited by examiner

ADAPTIVE COMPRESSION QUALITY

CROSS-REFERENCE TO RELATED APPLICATIONS

This application is a continuation of U.S. application Ser. No. 10/353,765, filed Jan. 28, 2003, now U.S. Pat. No. 7,551,787 B2, issued Jun. 23, 2009.

FIELD OF THE INVENTION

This invention relates generally to data compression and recompression and, more particularly, to a technique for incrementally storing additional images in a given storage area.

BACKGROUND INFORMATION

Compression associated with data, especially data in the form of images, generally is "lossy compression", although, as will be described presently; in some instances, "lossless compression" may be used. Standard well-known "lossy compression" techniques, such as JPEG, sacrifice fine details in the image to gain storage efficiency, minimizing file size. The degree of compression in the stored image is referred to as its "quality" or "Q" factor.

It is often the case that the amount of information to be stored exceeds the resource available to hold it. For example, a vacationing user may have a digital camera with one "FLASH ROM". If conditions are conducive to photography and opportunities are abundant, the photographer may fill the non-volatile storage before the vacation is completed. If new opportunities for photographs present themselves, the photographer must decide whether to delete images to make room for others.

It is, therefore, an object of this invention to provide a technique (method, system, apparatus, article of manufacture, signal-bearing media) to adaptively adjust compression quality of data to permit the incremental storage into a pre-determined space-of-objects, which may be lossily-compressed.

For expository purposes, the invention will be described in terms of a digital camera, i.e. a camera which records images as compressed files in a fixed-size non-volatile storage, although this should not be construed as limiting the scope of the invention. The invention can be practiced in any situation which allows for lossy data compression. It is also useful in some situations where lossy compression is not acceptable, but where a plurality of lossless compression schemes are available, the denser ones requiring more time or resource to execute. Although the storage described herein is customarily semiconductor non-volatile storage, the invention is not limited to that type; rotating magnetic (disk) storage, tape storage, or any other digital storage may be utilized.

SUMMARY OF THE INVENTION

In one embodiment, a method of storing multiple captured images in digital form includes storing an image captured in a digital form in a first format in a digital storage device with an image already stored in the digital form in the storage device, and determining if a percentage of a finite storage capacity of the digital storage device needed to store the captured and already stored images in the storage device exceeds a pre-set threshold value, wherein storage used of the finite storage capacity to store images may exceed the pre-set threshold value. If the percentage of storage space needed to store the captured and already stored images in the storage device is determined to exceed the pre-set threshold value, then the method compresses at least one of the captured and already stored images and stores all of the captured and already stored images, including all of the compressed images of the captured image and the already stored image, in the storage device.

In another embodiment, a device for storing multiple captured images in digital form includes a digital storage device operatively connected to a structure to capture an image in a digital form, wherein the digital storage device has a finite storage capacity for storing the images in the digital form. The device embodiment thus stores an image captured in a digital form in a first format in a digital storage device with an image that is already stored in the digital form in the storage device, and determines if a percentage of a finite storage capacity of the digital storage device that is needed to store the captured and already stored images in the storage device exceeds a pre-set threshold value, wherein the storage used of the finite storage capacity to store images may exceed the pre-set threshold value. The device embodiment automatically compresses at least one of the captured and already stored images if the determined percentage of storage space needed to store the captured and already stored images exceeds the pre-set threshold value, and stores all of the captured and already stored images, including all of the compressed images of the captured image and the already stored image in the storage device.

In another embodiment, a computer program product for storing multiple captured images in digital form includes a computer readable storage device having computer executable program code stored thereon. The program code comprises instructions which, when executed on a programmable device, cause the programmable device to store an image captured in a digital form in a first format in a digital storage device with an image that is already stored in the digital form in the storage device, and to determine if a percentage of a finite storage capacity of the digital storage device that is needed to store the captured and already stored images in the digital storage device exceeds a pre-set threshold value, wherein the storage used of the finite storage capacity to store images may exceed the pre-set threshold value. The programmable device is also thereby further caused to automatically compress at least one of the captured and the already stored images if the determined percentage of storage space needed to store the captured and already stored images exceeds the pre-set threshold value, and to store all of the captured and the already stored images, including all of the compressed images, the captured image and the already stored image, in the storage device.

DESCRIPTION OF THE PREFERRED EMBODIMENTS

Figure 1:
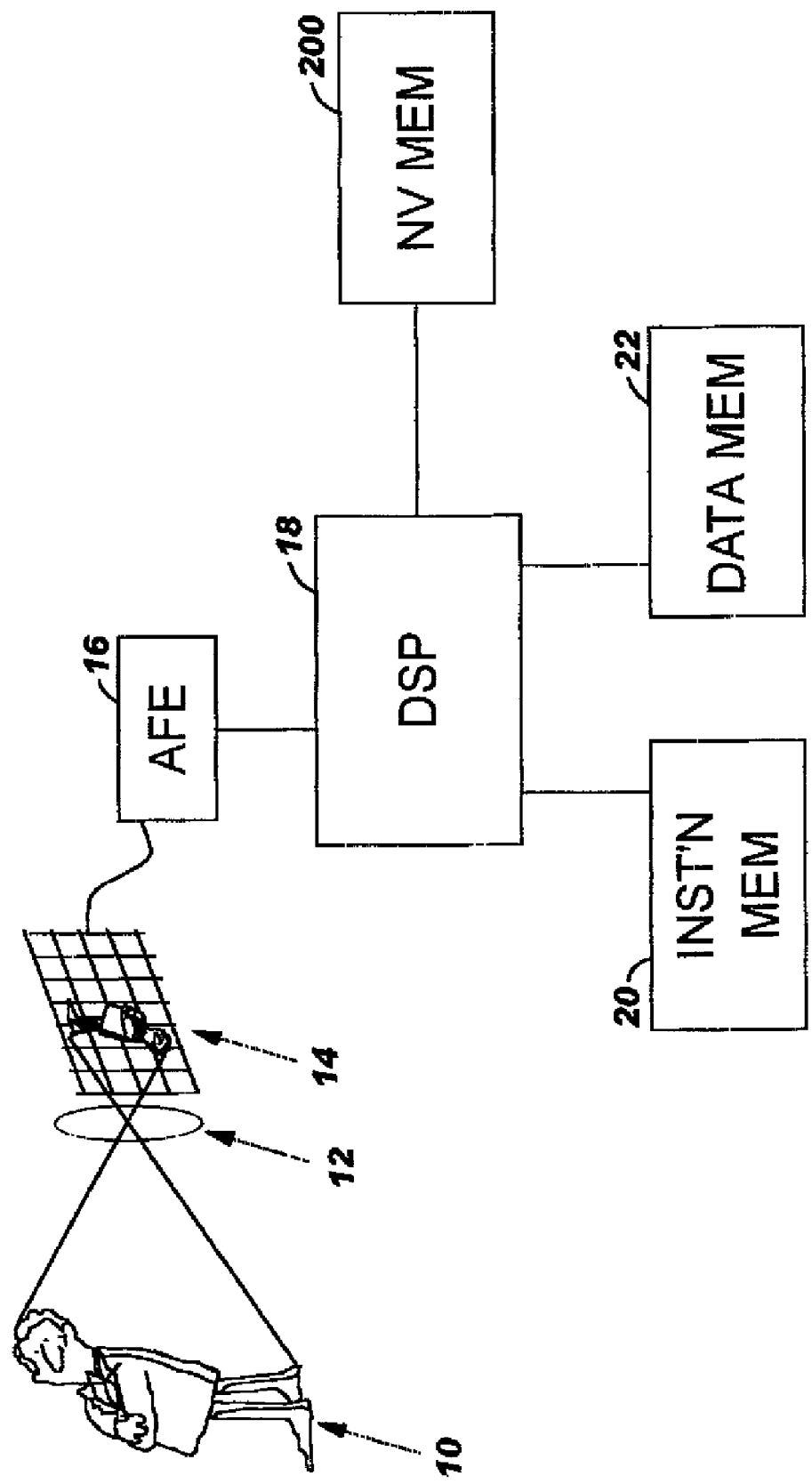
FIG. 1 is a conceptual representation of the operation of a digital camera.

Referring now to the drawings and, for the present, to FIG. 1, the operation of a digital camera is illustrated. Image 10 is imaged by lens 12 onto Charge-Coupled-Device (CCD) array 14. A CCD array is an array of cells. When the cells are exposed to light, each cell accumulates electrical charge proportional to the amount of incident light. After the image is captured, the cells may be operated like a shift register, i.e. to shift the charges to an Analog Front End (AFE) 16. Some CCD devices are constructed with red, green and blue filters over various cells, to sample the amount of light of each color, at each image point. One such device is the FTF3020-C Full Frame Image Sensor manufactured by Philips Semiconductors. The AFE 16 comprises a programmable gain amplifier and an Analog-to-Digital Converter (ADC). A typical AFE 16 is the HD49334NP produced by Hitachi, Ltd. The AFE 16 is controlled by a Digital Signal Processor (DSP) 18. The DSP 18 executes instructions in instruction memory 20 and causes the image content to be successively shifted out of the CCD array 14 and sampled (converted to digital form) by AFE 16. The digital data representing the captured image is stored in data memory 22. DSP 18 performs compression on the captured image data and stores the compressed image in non-volatile memory 200, also see FIG. 3.

Compression on color images is performed on three separate images captured as the red, green and blue contributions. Each is treated as a gray-scale image. DSP 18 can perform lossless or lossy compression.

Lossless compression may involve run-length encoding, which is well-known. Run-length encoding is performed by replacing a sequence of repeated identical values with one instance of the value and a count. A more advanced coding, Lempel-Ziv encoding, stores repeated sequences of values in a dictionary and makes reference to them by their dictionary indices. A suitable method is described in U.S. Pat. No. 4,814,746 to Miller and Wegman, assigned to International Business Machines Corp., and incorporated herein by reference. When lossless compression is reversed, the decompressed data is identical to the original data prior to compression.

However, the invention in the preferred embodiment works best with lossy compression. The degree of compression can be varied, resulting in less or more loss of fine detail in the image and correspondingly greater or lesser size of the compressed image. In the well-known JPEG scheme, devised by the Joint Photographic Experts Group, the image is divided into blocks. The image data is transformed using the discrete cosine transform (similar to the Fourier transform) to the frequency domain. The result is a series of coefficients, the first representing the base (DC) intensity, and subsequent ones each representing intensity at finer levels of detail. An image of higher compression (and greater loss) has fewer coefficients in the series. Compression techniques in the JPEG format are shown and described in U.S. Pat. No. 5,677,689, dated Oct. 14, 1997, which is also incorporated herein by reference. When lossy compression is reversed, the decompressed data is not the same as the original data. Some detail, depending upon the degree of compression, will have been lost.

Image recompression with a higher compression factor may be performed by expanding the image from the compressed frequency-domain format (which resides in nonvolatile memory 200) into data memory 22 in image format, and then recompressing it at a higher compression factor. However, the preferred way to recompress the image is to recompress it directly in the frequency domain, by copying the data, while deleting higher order coefficients (in the JPEG format). Direct data recompression in the frequency domain is shown and described in U.S. Pat. No. 6,128,413 entitled Mapping Through Interval Refinement, incorporated herein by reference. The image may be manipulated directly in nonvolatile memory 200 or by copying it to data memory 22.

As indicated previously, the present invention will be described as it is embodied in a digital camera. However, there are many other uses to which this technique can be applied. For example, in recorded speech, a digital answering machine or other types of voice-mail re-compresses messages to make room for more messages. In recorded audio, an MP3 player, or a computer that loads it, could compress the audio a bit more to get more pieces onboard. (MP3 is itself lossy compression of sampled audio). In video, a motion video camera could recompress its data in a manner similar to a still camera. The technique of the invention can be used to compress other data that represents time-series; for example, digitized ECG waveforms.

In one embodiment for carrying out the invention, each image is stored in nonvolatile storage, uncompressed, as it is captured. Subsequently, storage is checked to see whether an adaptive threshold percentage or value of storage capacity, e.g. 90 percent, has been exceeded. If the uncompressed image exceeds this threshold value, the image is compressed by a Q1 factor so that the area it covers is lower than the threshold value, and then stored in storage at this Q1 compression factor. When a new image is captured, storage is checked to see if the storage of the new image would exceed the threshold value and, if not, then the new image is stored in the uncompressed form. If the threshold value is exceeded, then existing images are recompressed by a factor of Q2 and the new image is compressed either by a factor of Q1 or Q2. This continues until the compression has reached a given Qn level. The adjusting of the compression of Q factor is described in said U.S. Pat. No. 5,677,689. Also, the adjusting of a digital camera to store at a given Q factor is well known.

With respect to the amount of compression that can be effectively utilized, it is difficult to perceive the difference between an original 11 KB image and one compressed to 2 KB. In fact, it is difficult to even perceive a difference down to about 1.5 KB. Thus, compression in excess of 6:1 and even up to about 8:1 can be achieved without the significant loss of perceived clarity of image.

Figure 2:
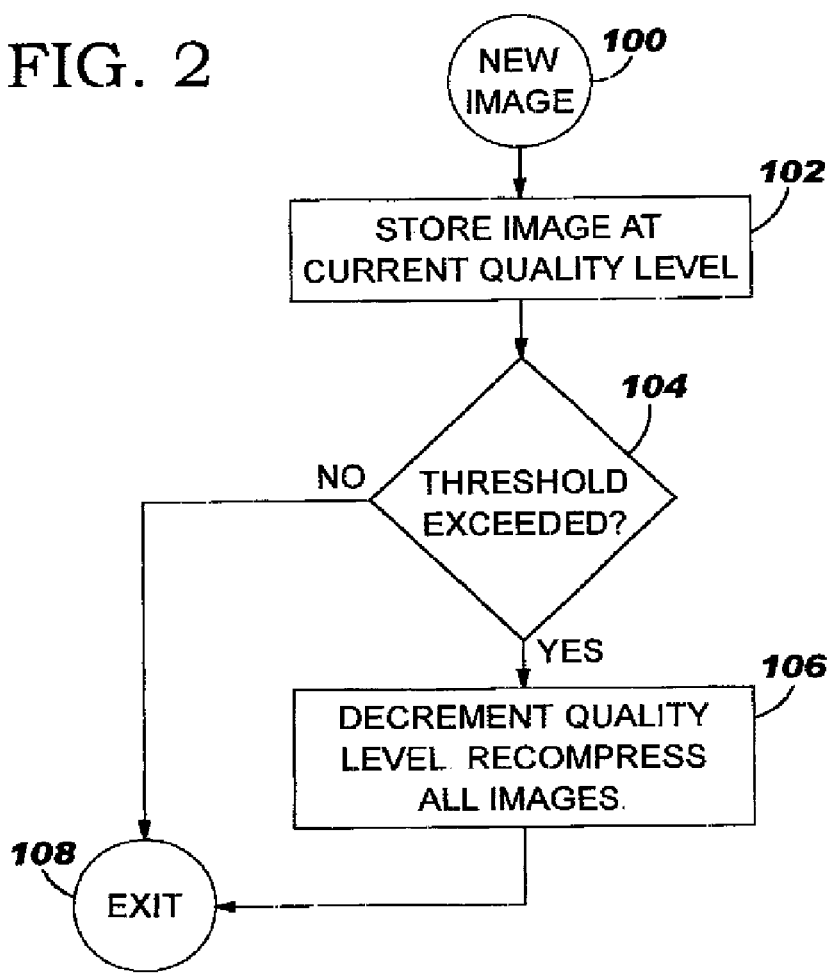
FIG. 2 shows a flow chart for processing to store an image.
Figure 3:
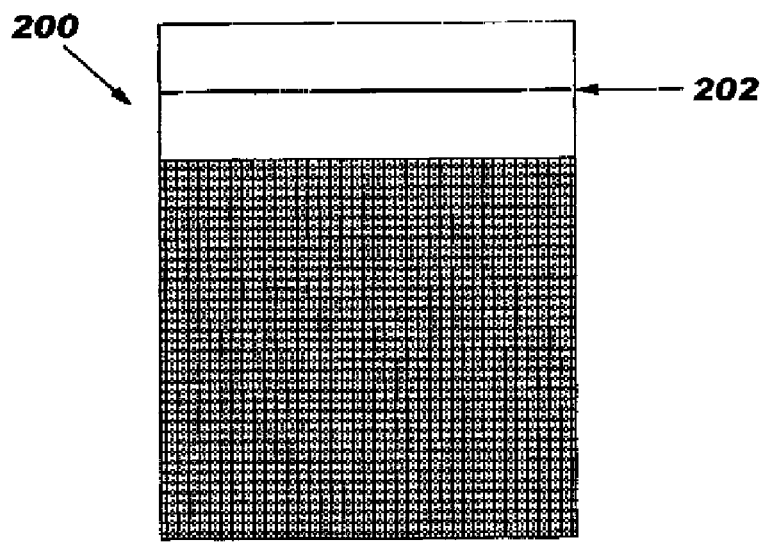
FIG. 3 shows storage partially filled with images compressed at a medium quality.

This sequence, which is a signal in the form of a program or set of instructions for a computer contained on a medium, such as a magnetic disc or a semi-conductor chip, is depicted in the flow chart shown in FIG. 2. A new image is captured at 100. The image is stored at the current quality level in step 102. After the image is stored, the storage used is checked, as shown in step 104. If the threshold is not exceeded, the compression exits, at step 108. This condition is shown in FIG. 3, where 200 represents the non-volatile storage used, and 202 represents the threshold for reducing the quality or Qn of compression. If the threshold is exceeded when tested in step 104, then all the images are recompressed at a lower quality level Qx, as shown in step 106.

Figure 4:
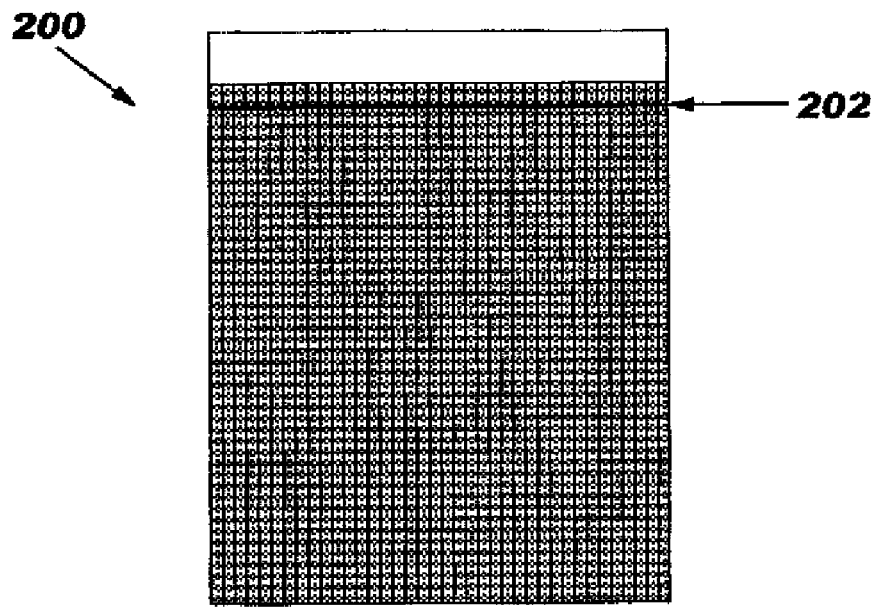
FIG. 4 shows the storage as an additional image is added which fills the storage past the adaptive compression threshold value.

FIG. 4 depicts the storage 200 shown in FIG. 3 after an additional image has been added and the threshold is exceeded after carrying out step 102. The storage used in non-volatile storage 200 exceeds threshold 202.

Figure 5:
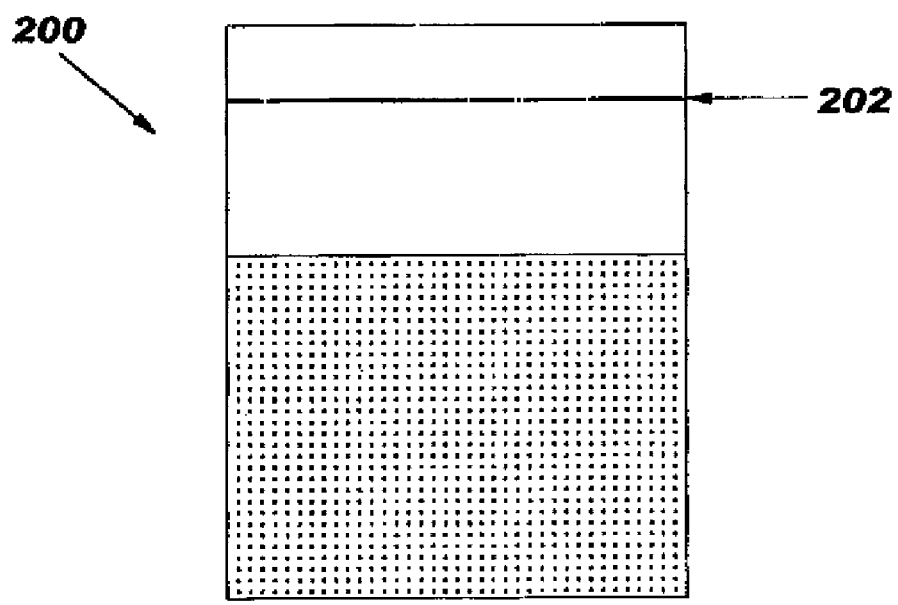
FIG. 5 shows the storage after the adaptive compression technique has operated and the images are re-stored at lower quality.

FIG. 5 depicts the storage 200 shown in FIG. 4 once the compression in step 106 has been carried out. Threshold 202 (e.g. 90 percent) is no longer exceeded, and the images are stored with less detail at a more compressed Qn Value. Storage use is reduced, and additional images may be stored before subsequent quality reduction is required.

Figure 6:
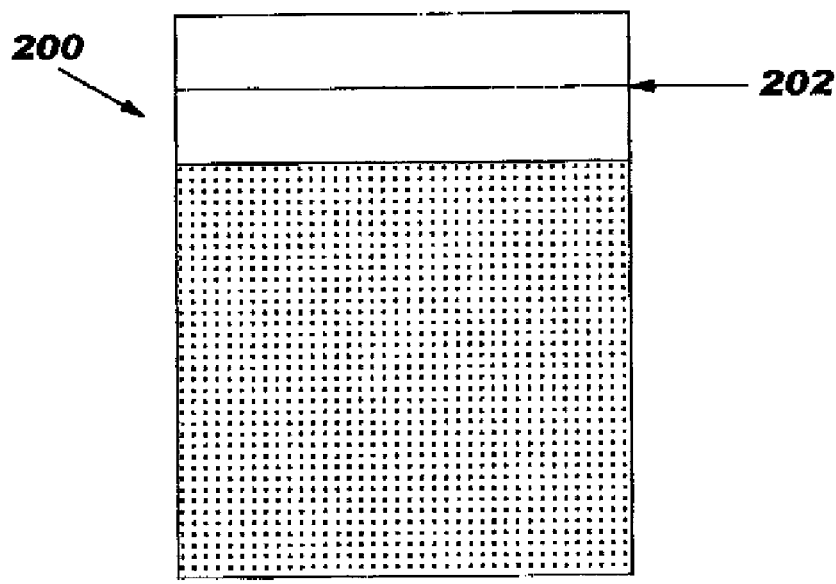
FIG. 6 shows the storage after an additional image has been stored.

FIG. 6 shows the condition of the storage 200 shown in FIG. 5 after an additional image has been stored. The compression process 106 may be carried out starting out with the images stored lowest in storage 200, with each successive image being copied lower in storage as space is made available from the previous image, or by other techniques, such as using free storage at the top of storage 200 (above threshold 202) or by using another storage device for intermediate storage, or by compressing each image in place and storing new images in fragmented storage.

Figure 7:
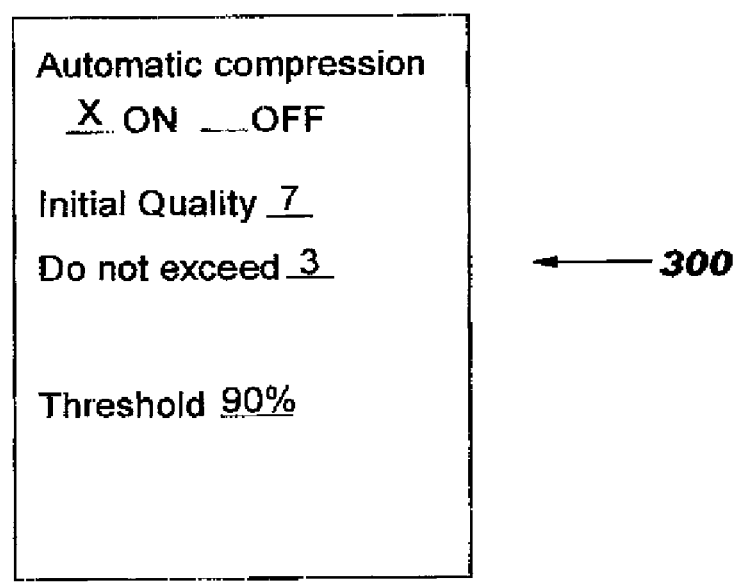
FIG. 7 shows a user interface screen where the user may select adaptive compression and establish defaults.

FIG. 7 shows a screen 300 which may be presented to a user to select whether adaptive compression is used, which quality level to initially use, and the lowest quality level the user will accept. This prevents the user from inadvertently storing too much information and reducing quality below an acceptable value. The user may also set the threshold higher (i.e. higher than 90 percent), which higher threshold will cause more frequent compression once exceeded. A lower threshold will cause compression sooner, reducing quality sooner.

There are alternate modes for practicing the present invention in which the steps may be carried out in another sequence. As each image is captured, the threshold is tested. If threshold is exceeded, the quality level is reduced and all stored images are re-compressed before the current image is stored. This method is inferior in some circumstances because it requires processing before the current image is stored, which may interfere with an immediately-subsequent capture. The method depicted in FIG. 2 is more amenable to compression via "background processing" once all images are safely stored.

FIGS. 8-11 represent an alternate mode for practicing the present invention. (FIG. 8 also represents a program or set of instructions for a computer contained on a medium, such as a magnetic disc, or a semi-conductor chip.) In this mode, captured images are never re-compressed. One or more thresholds are defined and, as each threshold is exceeded, new images are captured and compressed at successively lower quality levels.

Figure 8:
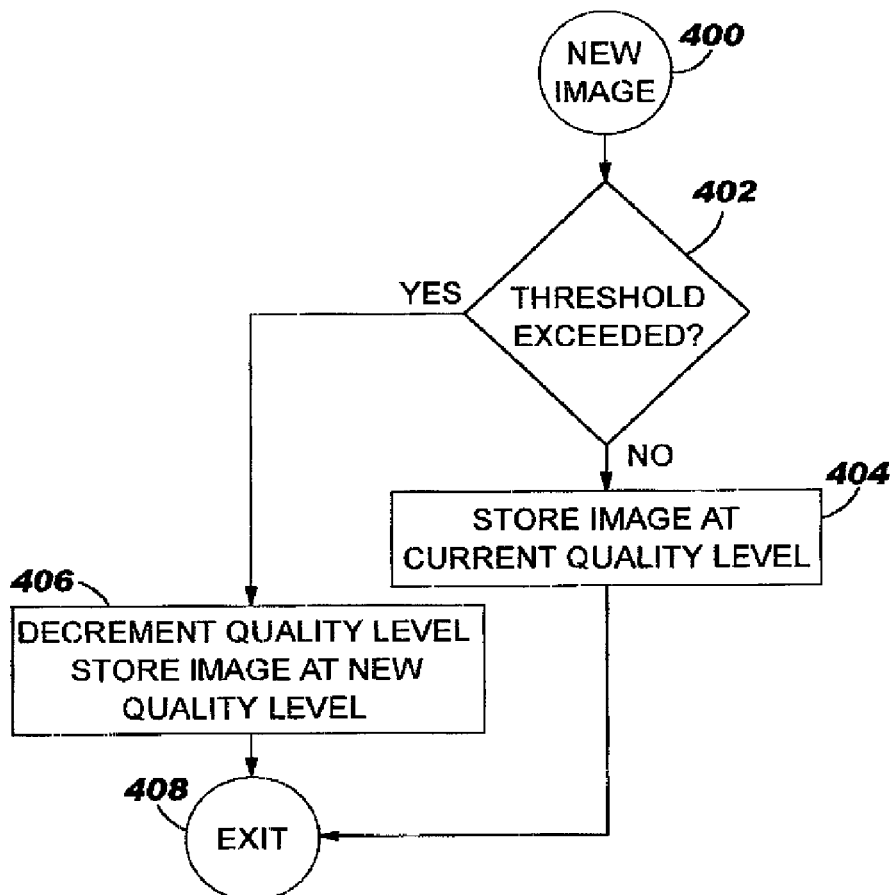
FIG. 8 shows a flow chart of an alternate embodiment in which the quality of captured images is not revised, but new images are stored at progressively lower qualities as successive thresholds are crossed.

With reference to FIG. 8, after each image is captured at step 400, the threshold is tested at step 402. If the pre-set threshold is exceeded, the quality or Qn level is reduced and the current image and all subsequent images are stored at the new quality level at step 406. The process is exited at step 408, regardless of whether the threshold was exceeded.

Figure 9:
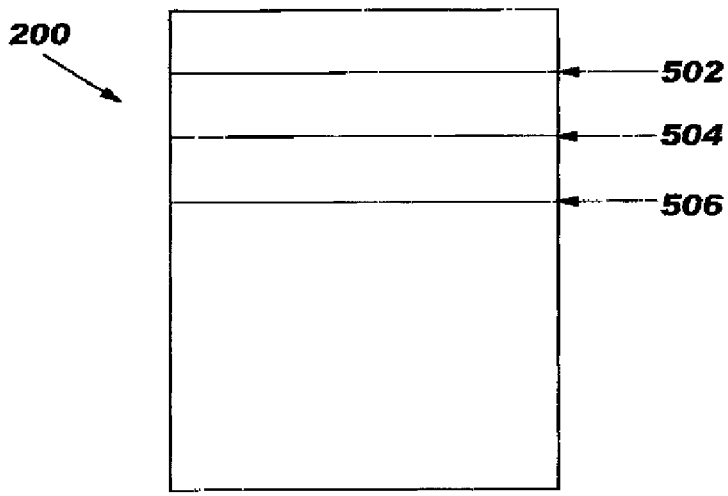
FIG. 9 shows empty storage with quality adjustment threshold values.

FIG. 9 depicts storage 202 with several thresholds 502, 504, and 506 at which quality is to be successively reduced.

Figure 10:
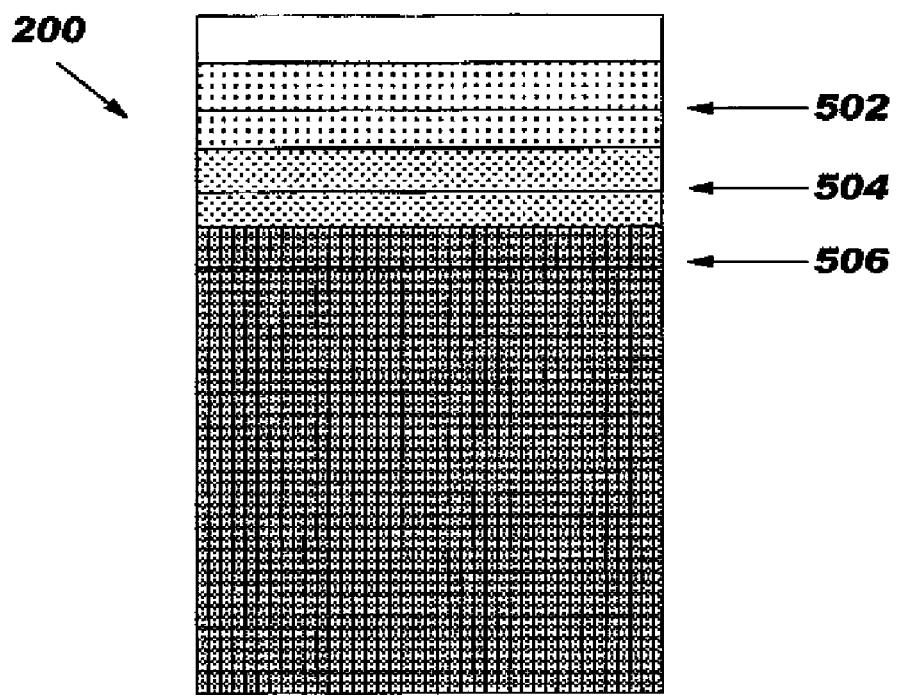
FIG. 10 shows storage after images have been captured, where the alternate embodiment technique has been utilized.

FIG. 10 depicts the storage and thresholds once images have been captured, using the alternate technique shown in FIG. 8. In FIG. 10, images captured after each threshold is exceeded are first captured and then reduced to lower quality or Q levels.

Figure 11:
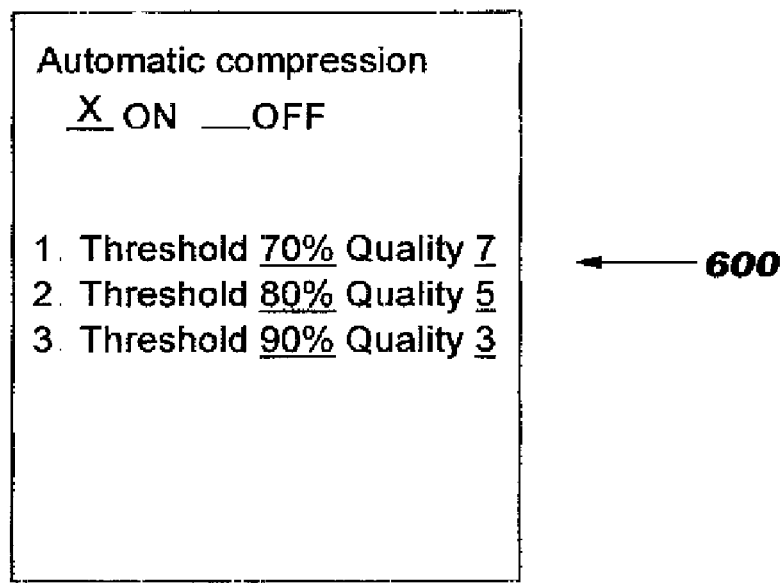
FIG. 11 shows a user interface screen where the user may select adaptive compression and establish defaults for the alternate embodiment.

FIG. 11 depicts a screen 600 presented to a user that can be used to configure a device utilizing the alternate embodiment.

The foregoing description of various aspects of the invention has been presented for purposes of illustration and description. It is not intended to be exhaustive or to limit the invention to the precise form disclosed, and obviously, many modifications and variations are possible. Such modifications and variations that may be apparent to a person skilled in the art are intended to be included within the scope of the invention as defined by the accompanying claims.

What is claimed is:

1. A method of storing multiple captured images in digital form, comprising:
   storing an image captured in a digital form in a first format in a digital storage device with an image that is already stored in the digital form in the storage device;
   determining if a percentage of a finite storage capacity of the digital storage device that is needed to store the captured and already stored images in the storage device exceeds a pre-set threshold value, wherein storage used of the finite storage capacity to store images may exceed the pre-set threshold value;
   if the percentage of storage space needed to store the captured and already stored images in the storage device is determined to exceed the pre-set threshold value, then compressing at least one of the captured and already stored images; and
   storing all of the captured and already stored images, including all of the compressed images of the captured image and the already stored image, in the storage device.

2. The method of claim 1, wherein the first format is in a first mode having a compression factor, and wherein the compressing the at least one of the captured and already stored images comprises compressing in a second compressed mode having a compression factor that is higher than the first mode compression factor.

3. The method of claim 1, further comprising:
   for each subsequent image that is newly captured, if a space needed to store already saved images and the subsequent newly captured image in the storage device exceeds the pre-set threshold value:
   recompressing at least one of the already saved images by a recompression factor that is higher than the compression factor of the at least one already saved image;
   compressing the subsequent newly captured image; and
   storing all of the images, including the recompressed at least one of the already saved images and the compressed subsequent newly captured image, in the storage device.

4. The method of claim 1, further comprising:
   providing a selector to select the pre-set threshold value and a compression factor in association with the pre-set threshold value.

5. The method of claim 1, wherein only the captured image is compressed in the compressing the at least one of the captured and already stored images, the method further comprising:
   for each subsequent image that is newly captured, if a space needed to store the already saved images and the subsequent newly captured image in the storage device exceeds the pre-set threshold value, compressing the subsequent newly captured image and storing the compressed subsequent newly captured image with the already saved images in the storage device.

6. The method of claim 1, wherein the compression in the compressing the at least one of the captured and already stored images is lossy compression.

7. The method of claim 5, wherein the pre-set threshold value is associated with a pre-set threshold compression factor, the method further comprising:

for the each subsequent newly captured images, if a space needed to store the subsequent newly captured image compressed by the pre-set threshold compression factor with the already saved images in the storage device exceeds another threshold value of the percentage of available storage space used to store images in the digital storage device that is higher than the pre-set threshold value and that is associated with another threshold compression factor that is higher than the pre-set threshold compression factor associated with the pre-set threshold value, then compressing the subsequent newly captured image with the another threshold compression factor and storing the subsequently captured image compressed by the another threshold compression factor with the captured and already stored images in the storage device.

8. The method of claim 3, further comprising:

repetitively increasing the compression factor used to compress each image each time the space needed to store already saved images and the newly captured image in the storage device exceeds the pre-set threshold value.

9. The method of claim 8, further comprising limiting the increasing of the compression factor to a maximum value.

10. A device for storing multiple captured images in digital form, comprising:

a digital storage device operatively connected to a structure to capture an image in a digital form, the digital storage device having a finite storage capacity for storing the images in the digital form;

wherein the device:

stores an image captured in a digital form in a first format in a digital storage device with an image that is already stored in the digital form in the storage device;

determines if a percentage of a finite storage capacity of the digital storage device that is needed to store the captured and already stored images in the storage device exceeds a pre-set threshold value, wherein the storage used of the finite storage capacity to store images may exceed the pre-set threshold value; and automatically compresses at least one of the captured and already stored images if the determined percentage of storage space needed to store the captured and already stored images exceeds the pre-set threshold value; and stores all of the captured and already stored images, including all of the compressed images of the captured image and the already stored image, in the storage device.

11. The device of claim 10, wherein the first format is in a first mode having a compression factor, and the device automatically compresses at least one of the captured and already stored images in a second compressed mode having a compression factor that is higher than the first mode compression factor.

12. The device of claim 10, wherein the device further:

determines for each subsequent image that is newly captured if a space needed to store already saved images and the subsequent newly captured image in the storage device exceeds the pre-set threshold value; and if the space needed to store already saved images and the subsequent newly captured image in the storage device exceeds the pre-set threshold value:

recompresses at least one of the already saved images by a recompression factor that is higher than the compression factor of the at least one already saved image;

compresses the subsequent newly captured image; and stores all of the images, including the recompressed at least one of the already saved images and the compressed newly captured image, in the storage device.

13. The device of claim 10, further comprising a selector that selects the pre-set threshold value and a compression factor in association with the pre-set threshold value.

14. The device of claim 10, wherein the device further:

automatically compresses at least one of the captured and already stored images by compressing only the captured image; and for each subsequent image that is newly captured, if a space needed to store the already saved images and the subsequent newly captured image in the storage device exceeds the pre-set threshold value, compresses the subsequent newly captured image and stores the compressed subsequent newly captured image with the already saved images in the storage device.

15. The device of claim 10, wherein the device further automatically compresses at least one of the captured and already stored images by lossy compression.

16. The device of claim 14, wherein the pre-set threshold value is associated with a pre-set threshold compression factor, and wherein the device further:

for each of the subsequent newly captured images, if a space needed to store the subsequent newly captured image compressed by the pre-set threshold compression factor with the already saved images in the storage device exceeds another threshold value of the percentage of available storage space used to store images in the digital storage device that is higher than the pre-set threshold value and that is associated with another threshold compression factor that is higher than the pre-set threshold compression factor associated with the pre-set threshold value, compresses the subsequent newly captured image with the another threshold compression factor and stores the compressed subsequent newly captured image with the captured and already stored images in the storage device.

17. The device of claim 12, wherein the device further repetitively increases the compression factor used to compress each image each time the space needed to store already saved images and the subsequent newly captured image in the storage device exceeds the pre-set threshold value.

18. The device of claim 17, wherein the device further limits increasing of the compression factor to a maximum value.

19. A computer program product for storing multiple captured images in digital form, comprising:

a computer readable storage device; and computer executable program code stored on the computer readable storage device, the program code comprising instructions which, when executed on a programmable device, cause the programmable device to:

store an image captured in a digital form in a first format in a digital storage device with an image that is already stored in the digital form in the storage device;

determine if a percentage of a finite storage capacity of the digital storage device that is needed to store a the captured and already stored images in the digital storage device exceeds a pre-set threshold value, wherein the storage used of the finite storage capacity to store images may exceed the pre-set threshold value;

automatically compress at least one of the captured and the already stored images if the determined percentage of storage space needed to store the captured and already stored images exceeds the pre-set threshold value; and store all of the captured and the already stored images, including all of the compressed images, the captured image and the already stored image, in the storage device.

20. The computer program product of claim 19, wherein the first format is in a first mode having a compression factor, the program code comprising instructions which, when executed on the programmable device, further causes the programmable device to automatically compress the at least one of the captured and already stored images in a second compressed mode having a compression factor that is higher than the first mode compression factor.

21. The computer program product of claim 19, the program code comprising instructions which, when executed on the programmable device, further causes the programmable device to:

determine for each subsequent image that is newly captured if a space needed to store already saved images and the subsequent newly captured image in the storage device exceeds the pre-set threshold value; and if the space needed to store already saved images and the subsequent newly captured image in the storage device exceeds the pre-set threshold value:

recompress at least one of the already saved images by a recompression factor that is higher than the compression factor of the at least one already saved image;

compress the subsequent newly captured image; and store all of the images, including the recompressed at least one of the already saved images and the compressed subsequent newly captured image, in the storage device.

22. The computer program product of claim 19, the program code comprising instructions which, when executed on the programmable device, further causes the programmable device to provide a selector to select the pre-set threshold value and a compression factor in association with the pre-set threshold value.

23. The computer program product of claim 19, the program code comprising instructions which, when executed on the programmable device, further causes the programmable device to:

automatically compress at least one of the captured and already stored images by compressing only the captured image; and for each subsequent image that is newly captured, if a space needed to store the already saved images and the subsequent newly captured image in the storage device exceeds the pre-set threshold value, compress the subsequent newly captured image and store the compressed subsequent newly captured image with the already saved images in the storage device.

24. The computer program product of claim 19, the program code comprising instructions which, when executed on the programmable device, further causes the programmable device to automatically compress at least one of the captured and already stored images by lossy compression.

25. The computer program product of claim 19, wherein the pre-set threshold value is associated with a pre-set threshold compression factor, the program code comprising instructions which, when executed on the programmable device, further causes the programmable device to:

for each of the subsequent newly captured images, if a space needed to store the subsequent newly captured image compressed by the pre-set threshold compression factor with the already saved images in the storage device exceeds another threshold value of the percentage of available storage space used to store images in the digital storage device that is higher than the pre-set threshold value and that is associated with another threshold compression factor that is higher than the pre-set threshold compression factor associated with the pre-set threshold value, then compress the subsequent newly captured image with the another threshold compression factor and store the compressed subsequent newly captured image with the captured and already stored images in the storage device.

26. The computer program product of claim 19, the program code comprising instructions which, when executed on the programmable device, further causes the programmable device to repetitively increase the compression factor used to compress each image each time the space needed to store already saved images and the subsequent newly captured image in the storage device exceeds the pre-set threshold value.

27. The computer program product of claim 19, the program code comprising instructions which, when executed on the programmable device, further causes the programmable device to limit increases of the compression factor to a maximum value.

* * * * *